United States Patent [19]

Frank et al.

[11] 4,129,848

[45] Dec. 12, 1978

[54] PLATINUM FILM RESISTOR DEVICE

[75] Inventors: Robert I. Frank, Cambridge; Thomas E. Salzer, Bedford, both of Mass.

[73] Assignee: Raytheon Company, Lexington, Mass.

[21] Appl. No.: 812,866

[22] Filed: Jul. 5, 1977

Related U.S. Application Data

[63] Continuation of Ser. No. 610,012, Sep. 3, 1975, abandoned.

[51] Int. Cl.² ............... H01C 7/02; G01F 23/24; G01K 7/18; C23C 15/00
[52] U.S. Cl. ............... 338/308; 204/192 F; 204/192 D; 204/192 EC; 73/295; 73/362 AR; 338/309; 338/25
[58] Field of Search ......... 204/192 F, 192 E, 192 EC, 204/192 D; 338/25, 26, 28, 306, 308, 309, 211, 252; 73/295, 362 AR

[56] References Cited

U.S. PATENT DOCUMENTS

| 3,400,066 | 9/1968 | Caswell et al. ............... 204/192 |
| 3,669,861 | 6/1972 | Cash, Jr. et al. ............... 204/192 |
| 3,833,410 | 9/1974 | Ang et al. ............... 204/192 X |
| 3,845,443 | 10/1974 | Fisher ............... 338/25 |
| 4,072,593 | 2/1978 | Diehl et al. ............... 204/192 |

OTHER PUBLICATIONS

Bolker, B. F. T. and Sidles, P. H.; Thin-Film Platinum Resistance Thermometers—Fabrication and Use; J. Vac. Sci. Technol., vol. 14, No. 1, Jan./Feb. 1977, pp. 205–209.

*Primary Examiner*—John H. Mack
*Assistant Examiner*—William Leader
*Attorney, Agent, or Firm*—M. D. Bartlett; J. D. Pannone; H. W. Arnold

[57] ABSTRACT

A platinum film resistor device and method for making the same. A layer of quartz, deposited upon an insulative substrate preferably silicon, is sputter etched at high power levels to produce etch pits in the surface thereof. A layer of platinum is then deposited over the quartz layer by first sputtering platinum at high power for a relatively short period of time and then completing the layer by continuing to sputter deposit platinum at a lower power. A second layer of quartz is deposited over the layer of platinum and the second layer of quartz masked and chemically etched away in the regions where portions of the platinum layer are to be removed. The exposed platinum and a portion of the second quartz layer are then sputter etched away leaving the platinum in a predetermined configuration. The platinum is then annealed, the second quartz layer removed above the lead bonding pads, and external leads attached. The device is particularly useful in temperature measuring application.

6 Claims, 9 Drawing Figures

PLATINUM FILM RESISTOR DEVICE

The invention herein described was made in the course of or under a contract or subcontract thereunder with the Department of Defense.

This application is a continuation of Ser. No. 610,012, filed Sept. 3, 1975 now abandoned.

BACKGROUND OF THE INVENTION

1. Field of the Invention

The invention pertains to thin-film platinum resistor devices which are useful in measuring temperature over a wide range.

2. Description of the Prior Art

Platinum in wire or ribbon form has long been considered a primary resistance and temperature measuring standard because of its chemical inertness and physical stabiliy. For use as a resistance thermometer, where a measurement is used to determine temperature, platinum has the further advantage of possessing a high temperature coefficient of resistance which increases the sensitivity of the thermometer to temperature change.

However, the use of platinum in wire form has been found to possess a number of practical limitations. In many applications it has been found difficult to achieve a good thermal bond between the platinum and the object of which the temperature is being measured. A wire or layer of platinum of sufficiently thin cross section to produce an absolute resistance sufficiently high for many applications has resulted in a very fragile device.

Platinum deposited upon a semiconductor, ceramic, or other substrate and separated therefrom by a thermally electrically insulating layer has been desired as a device to overcome many of the problems of the prior devices. Unfortunately, platinum exhibits a poor adherence to most practical substrate and thermally insulating layer materials.

Platinum has been used as a conductive layer in several different integrated circuit configurations. In each of these, however, the layer of platinum was joined to the underlying substrate through a thin adhesion layer of chromium or titanium. However, a device thusly fabricated will not suffice for temperature measuring applications as the chromium or titanium layer changes the resistance of the platinum layer and neither one of these materials possesses the same chemical inertness and physical stability characteristics as platinum. If a device using a chrome or titanium adhesion layer were annealed as would be done in the normal fabrication of such a device, molecules of chromium or titanium would diffuse into the platinum layer changing its electrical properties and making the film unstable for use over a wide range of temperatures.

SUMMARY OF THE INVENTION

Accordingly, it is an object of the present invention to provide a platinum film resistor device in which the platinum film is bonded directly to a thermally and electrically insulative layer upon a supporting substrate.

It is also an object of the invention to provide a method for fabricating such a device using available integrated circuit processing techniques.

Moreover, it is an object of the invention to provide such a device with a high temperature coefficient.

These as well as other objects of the invention are met by providing the combination of a substrate support, a thermally insulative layer disposed upon at least one surface of the support, the surface of the thermally insulative layer opposite the support having a plurality of etch pits formed therein, and a layer of metal contacting the surface of the thermally insulative layer and extending into at least some of the etch pits and to thereby bond the layer of metal to the surface of the thermally insulative layer. The thermally insulative layer preferably comprises an oxide of a semiconductor material such as silicon dioxide. The layer of metal may comprise either platinum or nickel although platinum is the preferred material. The metal layer may be provided as a meandering strip or other geometric configuration with one or more leads coupled to the metal layer. An electrically and thermally insulative or passivation layer may be provided to cover at least portions of the metal layer as a protective coating thereon.

Objects of the present invention may also be met by a temperature sensing and measuring device comprising a silicon substrate, a first layer of silicon dioxide deposited upon at least one surface of the substrate, the first layer of silicon dioxide having therein a plurality of pits upon the surface of the first layer of silicon dioxide opposite the substrate, and a layer of platinum bonded to the surface of the first layer of silicon dioxide, the layer of platinum extending into at least some of the etched pits. The layer of platinum preferably comprises a meandering strip with at least one external lead coupled thereto. A second layer of silicon dioxide may also be provided which covers at least portions of the layer of platinum. The silicon substrate may either be substantially planar and solid or substantially planar with an aperture between the first layer of silicon dioxide and the surface of the silicon substrate opposite the first layer of silicon dioxide. The invention may further comprise utilizing means within temperature determining means or circuitry. The temperature determining means may also in accordance with the invention be used to determine the level of the fluid within fluid containing means. The invention may also be used as a resistive heating element for producing heat within a small area.

The invention may also be practiced by a method comprising the steps of providing a substrate support, providing a thermally insulative layer upon at least one surface of the substrate, sputter etching the thermally insulative layer to produce a plurality of etch pits upon the surface of the insulative layer, and sputter depositing a layer of metal over at least portions of the surface of the thermally insulative layer. The metal may be either nickel, tungsten, copper, iron or platinum with platinum being preferred. The substrate is a dielectric material, preferably silicon. The step of providing a thermally insulative layer comprises in the preferred embodiment growing a layer of silicon dioxide upon the substrate support using thermal oxidizing techniques. The metal layer may be etched in a predetermined configuration.

The invention may furthermore be practiced with a method comprising the steps of providing a silicon substrate, growing a layer of silicon dioxide upon at least one surface of the substrate, sputter etching the layer of silicon dioxide to produce a plurality of etch pits upon at least one surface thereof, sputter depositing a first quantity of platinum upon the surface of the layer of silicon dioxide at a first sputter power level and during a first time period, sputter depositing a second quantity of platinum over that platinum already deposited at a second sputter power level and during a second time period, sputter depositing a layer of quartz over the platinum, producing openings in the layer of quartz in a predetermined configuration, sputter etching portions of the platinum through openings in the layer of quartz, and attaching one or more external leads to the remaining portions of the platinum. In the preferred embodiment, the first power level is greater than the second power level and the first time period is less than the second time period. The platinum thusly deposited may be annealed by heating to a predetermined temperature for a predetermined period of time. A second layer of quartz may be deposited over the first layer of quartz and exposed portions of the platinum. The step of sputter depositing the layer of silicon dioxide may comprise the step of sputter depositing the silicon dioxide with a minimum sputtering power level of two watts per square inch. In the preferred embodiment, the first power level is within the range of 50-100 watts per square inch and the first time period is within the range of 2-20 seconds.

DESCRIPTION OF THE PREFERRED EMBODIMENTS

Figure 2A:
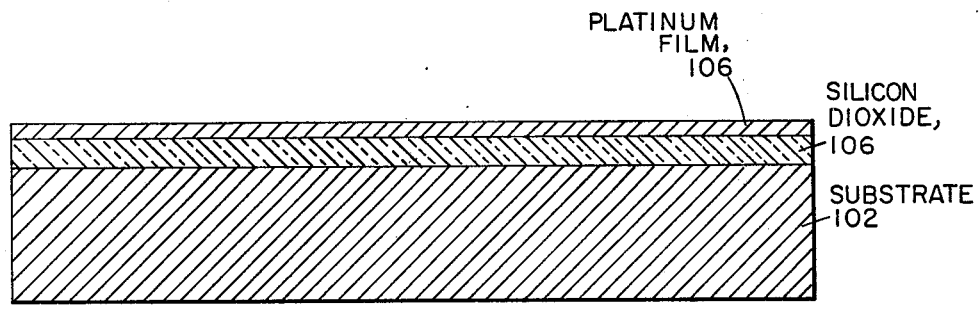
FIGS. 2A-2C are a cross-sectional view of the device shown in FIG. 1 taken along a first axis thereof and showing the device in various stages of construction.
Figure 2B:
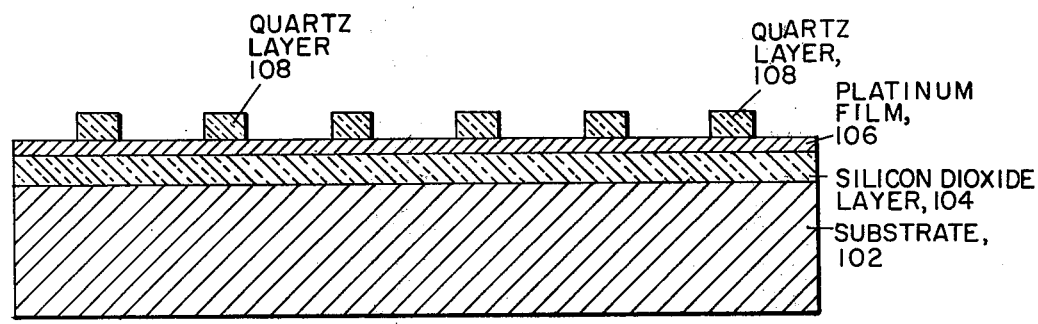
Figure 2C:
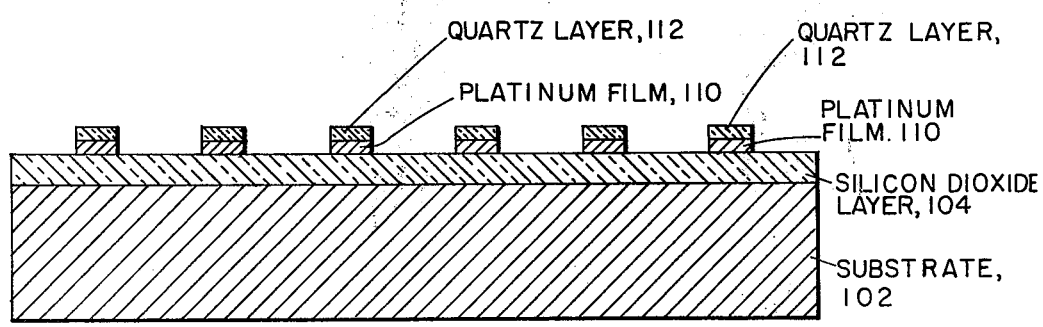

Referring first to FIGS. 2A-2C the fabrication of plantinum film resistor devices in accordance with the invention will be described. Fabrication commences by providing a substantially planar substrate 102 having at least one substantially smooth surface and which has been cleaned of any surface contaminants. Silicon or other semiconductor material is preferred for substrate 102 although other materials such as ceramics may be used as well.

Devices in accordance with the invention may be fabricated either singly or many at one time. In the latter case, a wafer of appropriate thickness is supplied, many identical platinum film patterns formed on one surface of the substrate in accordance with the procedure discussed below and the wafer finally separated into individual platinum film resistor devices.

After substrate 102 has been cleaned of any contaminants upon the upper surface thereof a layer of silicon dioxide 104 is grown on the cleaned surface. Silicon dioxide layer 104 may be produced by sputter depositing silicon dioxide upon the upper surface of substrate 102. However, preferably silicon dioxide layer 104 is grown as a layer of thermal oxide upon a silicon substrate by heating substrate 102 in an oxygen-containing atmosphere. The thickness of substrate 102 and silicon dioxide layer 104 is dependent upon the application to which the device is to be put. In general, the thicker silicon dioxide layer 104 and substrate 102 are made, the higher will be the thermal resistance of the finished device. However, silicon dioxide layer 104 should have a minimum thickness of approximately 1000Å to insure that there are no pinholes through silicon dioxide layer 104 after steps are performed to insure the adherence of platinum film 106 thereto. A thickness of approximately 2000Å has been found to be appropriate for devices having a relatively low thermal resistance. Thicknesses of 10,000Å or more may be used when it is desirable to increase the thermal resistance of the device.

The exposed surface of silicon dioxide layer 104 is next roughened to produce many microscopic pits or holes extending from the exposed surface downward but not so far as substrate 102. Portions of platinum film 106 may be deposited into these pits or holes to greatly increase the adherence of platinum to silicon dioxide layer 104. To produce these pits within the surface of silicon dioxide layer 104, the surface is sputter etched at relatively high sputtering powers for a sufficiently long time period to produce the requisite adherence. In one device constructed in accordance with the invention the surface of silicon dioxide layer 104 was sputter etched using argon as the sputter etchant for a time period of 15 minutes using a sputtering power of approximately 3 watts per square inch. It has been determined that with the use of argon as the sputter etchant a minimum power level of 2 watts per square inch or greater is required to produce sufficiently deep etch pits so that the platinum layer will adhere firmly to the surface of silicon dioxide layer 104. Power levels in the range of 3 to 4 watts per square inch are preferred.

Platinum film 106 is then sputter deposited above the roughened surface of silicon dioxide layer 104 using a two-step process. First, a small amount of platinum is sputter deposited at a first relatively high power level during a first relatively short time period. With the present example, a sputtering power of approximately 65 watts per square inch was used for a time period of approximately five seconds. During the second portion of the platinum deposition process, the power is reduced while sputter deposition of platinum continues until a desired platinum film thickness is reached. For the present example, a power of approximately 16 watts per square inch has been found adequate. The two-step platinum deposition process of the invention has been found to produce excellent bonding or adherence between platinum film 106 and silicon dioxide layer 104. In the initial step molecules of platinum arriving at the surface of silicon dioxide layer 104 have sufficient energy to dig into the roughened surface of silicon dioxide layer 104 and to at least partially fill the etch pits therein. The first portion of platinum film 106 thusly deposited serves to anchor the remaining portion of platinum film 106 to silicon dioxide layer 104.

Figure 1:
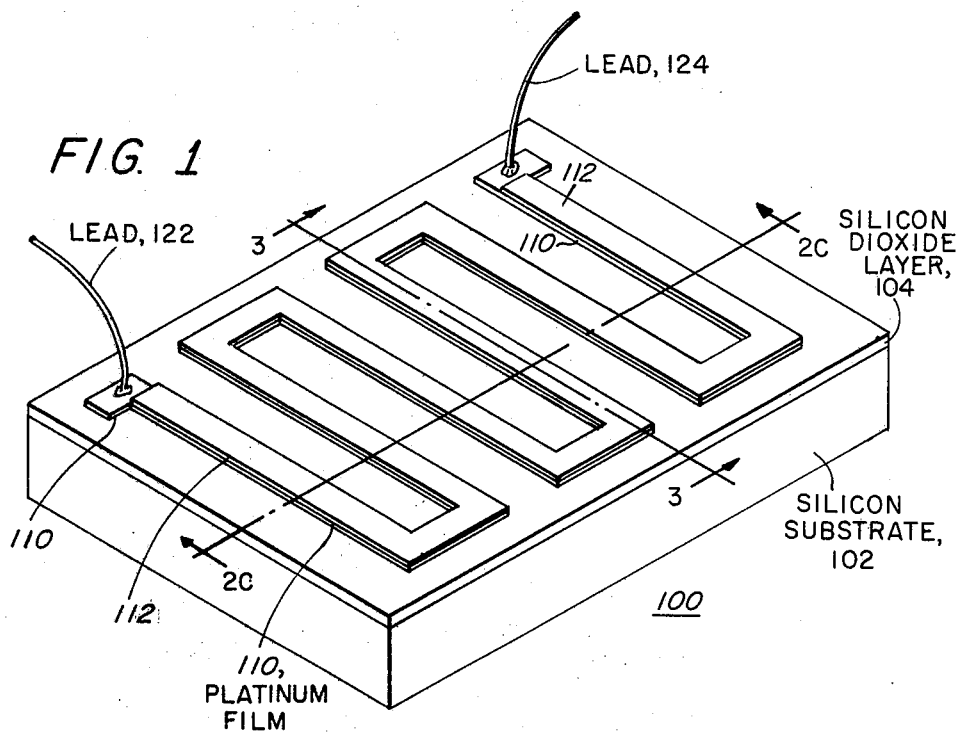
FIG. 1 shows a perspective view of a platinum film resistor device in accordance with the invention.
Figure 3:
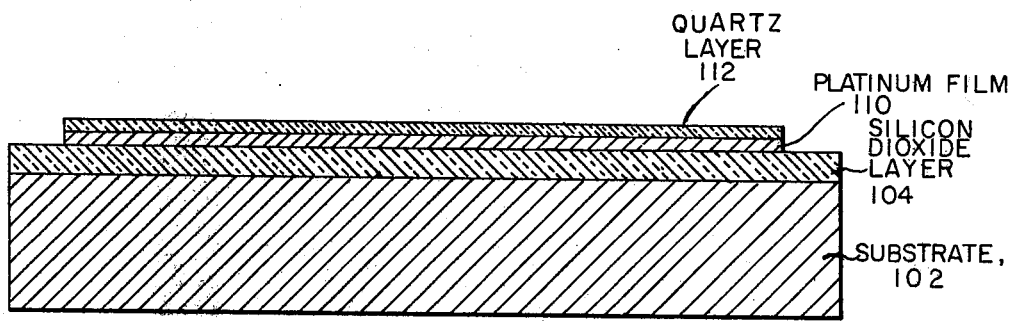
FIG. 3 is a cross-sectional view of the device shown in FIG. 1 taken along a second axis thereof.

The next step in the fabrication of platinum film resistor devices in accordance with the invention is to etch platinum film 106 so as to leave a predetermined preferred configuration such as the serpentine pattern shown in FIG. 1. Ordinary photomasking and chemical etching techniques are difficult to use with platinum as platinum is substantially unreactive with most etchants being desolved only in aqua regia which also dissolves away the photoresistive mask. Accordingly, a technique has been developed in accordance with the invention for etching platinum film 106 to its preferred configuration. A layer of quartz 108 is sputter deposited over platinum film 106. Preferably, quartz layer 108 has a thickness in the range of 3000–4000Å. Quartz layer 108 is then coated with photoresistive material, the photoresistive material exposed through a mask, developed and removed in those areas where portions of platinum film 106 are to be removed all in accordance with known photoresistive techniques. Corresponding portions of quartz layer 108 which underlie the apertures in the photoresistive layer are next removed by chemical etching. The remaining portion of the photoresistive material is then chemically dissolved away leaving quartz layer 108 as illustrated in FIG. 2B. A sputter etchant is applied to the entire upper surface of the device as shown in FIG. 2B thereby etching away the remaining exposed portions of platinum film 106 and a portion of quartz layer 108 leaving platinum film 110 and quartz layer 112 in the pattern shown in FIG. 2C.

Platinum as deposited in the procedure detailed above typically has a temperature coefficient of resistance in the range of 1,300–1,500 parts per million. The temperature coefficient of resistance may be changed to values as high as 3,000 parts per million or higher by annealing the platinum by heating the device shown in FIG. 2C at a temperature of approximately 1,000° C. The higher temperature coefficient of resistance is desirable for many temperature measuring applications in order to achieve as large an output signal change per degree temperature change as possible. This is especially important in temperature measuring applications for which the measured temperature is expected to vary only within a comparatively narrow range of values.

Apertures are opened above the ends of platinum film 110 by removing portions of quartz layer 112 where leads are to be attached to the device such as leads 122 and 124 as shown in FIG. 1. Leads 122 and 124 may be attached to platinum film 110 by welding or any other convenient method. Insulation or passivation material may be added around the juncture between leads 122 and 124 and platinum film 110.

Figure 5:
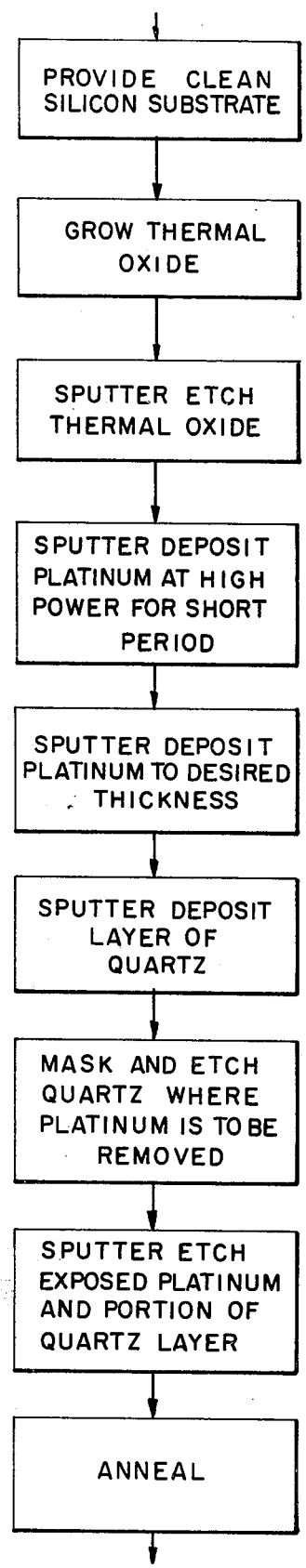
FIG. 5 is a diagram showing process steps for producing devices in accordance with the invention.

The basic steps for fabricating platinum film resistor devices are shown in the diagram of FIG. 5.

Figure 4:
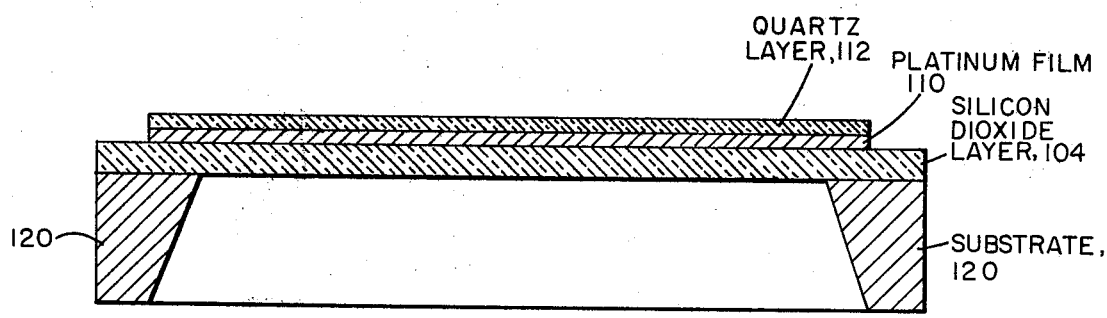
FIG. 4 shows an alternative embodiment of the device as shown in FIGS. 1 and 3.

As stated above, the thickness of silicon dioxide layer 104 and substrate 102 may be varied in accordance with the desired thermal resistance of the device. A second embodiment of the device such as that shown in FIG. 4 illustrates a way in which the thermal resistance of the device may be further lowered. In the embodiment shown in FIG. 4, substrate 120 has an aperture formed substantially in the center thereof between the lower surface of substrate 120 and silicon dioxide layer 104. Platinum film 110 lies wholly or mostly over the aperture within substrate 120. Preferential chemical etches as are well known in the integrated circuit fabrication art are used to etch substrate 120 in this particular configurtion. The embodiment shown in FIG. 4 is especially useful for temperature measuring applications where the device is placed within a fluid the temperature of which is to be measured continually or sampled at as rapid a rate as is possible where a fast response time is required.

Figure 6:
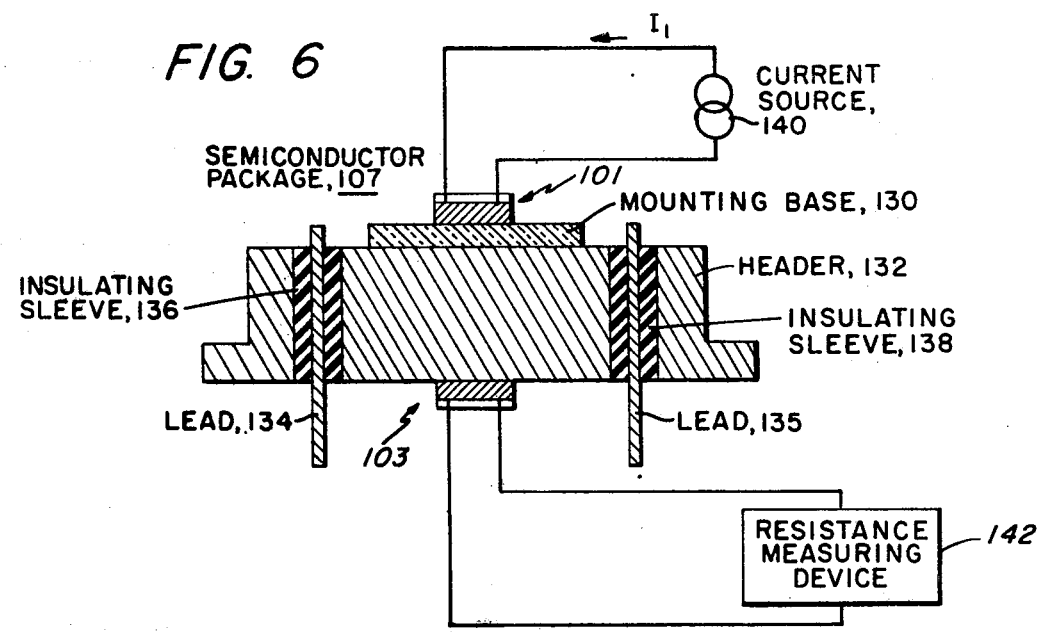
FIG. 6 is a cross-sectional view of a semiconductor package device being tested using platinum film resistor devices in accordance with the invention.

FIG. 6 illustrates an application in accordance with the invention of the previously described platinum film resistor devices as used to determine the temperature and heat transfer properties of an integrated circuit package. Two platinum film resistor devices 101 and 103 constructed in accordance with the teachings of the invention are used. Device 101, thermally coupled to mounting base 130, furnishes heat in simulation of an active semiconductor element as would normally be mounted upon mounting base 130. Preferably, platinum film resistor device 101 has the same peripheral dimensions as the integrated circuit or transistor chip which ultimately would be used with the particular package. Preferably, the platinum film which forms the resistive heating element is configured in the same areas as the heat generating regions of the integrated circuit or transistor chip. A current $I_1$ furnished by current source 140 flows through platinum film resistor device 101 causing platinum film resistor device 101 to act as a resistive heating element. The temperature of platinum film resistor device 101 is determined by the magnitude of current $I_1$ and the overall terminal resistance of platinum film resistor device 101. A second platinum film resistor device in accordance with the invention 103 is thermally coupled to the underside of metal header 132. Resistance measuring device 142, which may be an ohmmeter or alternatively a constant current source with a voltmeter coupled thereto in parallel, determines the resistance of platinum film resistor device 103. The temperature of device 103 is found by pre-calibrating its resistance as a function of temperature. Resistance measuring device 142 may be calibrated to read directly in temperature. The rate at which semiconductor package 107 dissipates heat may be measured by applying a current $I_1$ of known magnitude to platinum film resistor device 101 to produce heat at a known rate and by measuring the temperature of the outside of the device using platinum film resistor device 103, and resistance measuring device 142. The thermal resistance between a semiconductor chip mounted upon mounting base 130 and the lower side of metal header 132 may be determined by rapidly changing the temperature as applied to the device by platinum film resistor device 101 and by observing the rate at which the temperature at the bottom side of metal header 132 varies with platinum film resistor device 103 and resistance measuring device 142. Should it become necessary to simulate the thermal operation of semiconductor package 107 once that package has been hermetically sealed, the leads from platinum film resistor device 101 may be coupled to leads 134 and 135 within package 107 with current source 140 coupled to leads 134 and 135 outside package 107. The platinum film resistor devices of the present invention are particularly useful in the application illustrated in FIG. 6 because of their superior thermal resistance properties.

Figure 7:
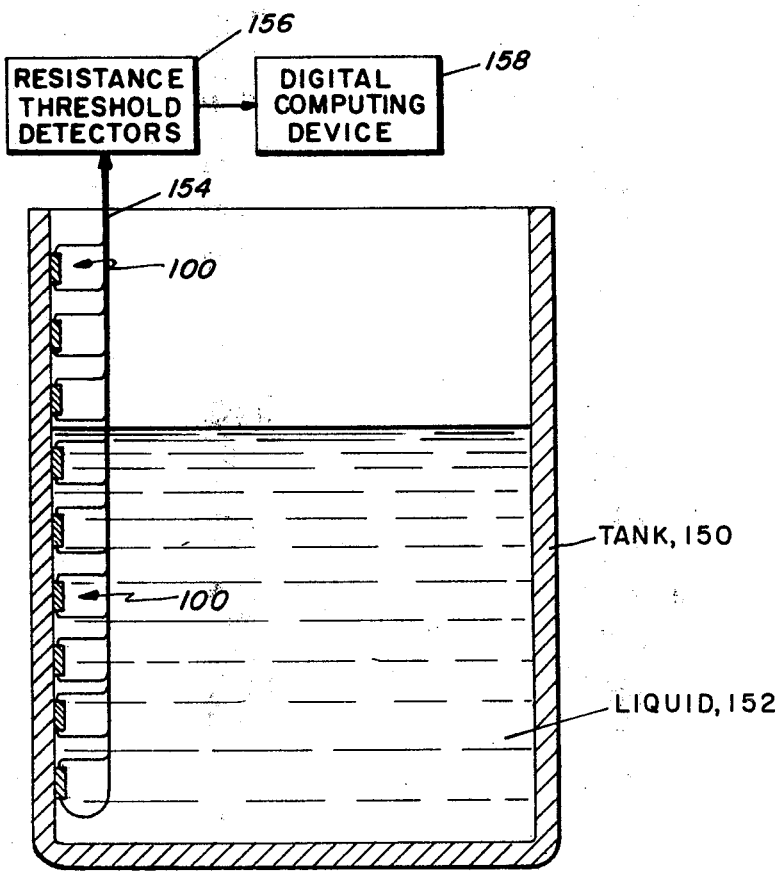
FIG. 7 shows the use of platinum film resistor devices in accordance with the invention as used in measuring the level of a liquid in a tank.

FIG. 7 illustrates an application for platinum film resistor devices in accordance with the invention for determining the level of liquid 152 within tank 150. A plurality of platinum film resistor devices 100 are spaced vertically along a side wall of tank 150. Each is coupled through cable 154 to resistance threshold detectors 156. In the embodiment illustrated here in FIG. 7, silicon dioxide layer 104 is made comparatively thick to achieve thermal isolation between the platinum film of devices 100 and the surface of tank 150. Alternatively, platinum film resistor devices 100 may be suspended within liquid 152 without touching the surface of tank 150. The rate at which heat is conducted away from each of devices 100 is determined by whether the device is surrounded by liquid 152 or by air. A small current is passed through each device 100 to cause heating thereof. For most common liquids, the heat transfer rate away from each of the devices 100 is substantially greater than for air. Accordingly, the temperature of those devices in air is higher than those devices in liquid 152. The resistance of hotter devices in air is higher than that of cooler devices in liquid. Resistance threshold detectors 156, one of which is coupled to each of platinum film resistance devices 100, produce a first output voltage for measured resistance values above a predetermined value and a second voltage for resistance values below the predetermined value. The predetermined value is chosen between the values of resistance in air and in liquid of devices 100. The outputs of resistance threshold detectors 156 are coupled to digital computing device 158 for digital processing as would be done in a process control system.

Many other uses are anticipated for platinum film resistor devices in accordance with the invention. The devices may be used in a quick indicating medical or instrumentation thermometer. One or more devices in accordance with the invention may be placed in a moving stream of cooling air to measure the temperature thereof and when coupled to appropriate circuitry signal the presence of a dangerously high temperature.

Although preferred embodiments of the invention have been described numerous modifications and alterations thereto would be apparent to one having ordinary skill in the art without departing from the spirit and scope of the invention.

What is claimed is:

1. The product comprising a platinum film resistor produced by the process comprising the steps of:
   providing a silicon substrate;
   growing a layer of silicon dioxide upon at least one surface of said substrate;
   sputter etching said layer of silicon dioxide to produce a plurality of etch pits upon one surface thereof;
   sputtering depositing a first quantity of platinum upon said surface of said layer of silicon dioxide at a first sputter power level and first time period;
   sputter depositing a second quantity of platinum upon said first quantity of platinum at a second sputter power level and second time period;
   sputter depositing a layer of quartz over said platinum;
   producing openings in said layer of quartz in a predetermined configuration;
   sputter etching portions of said platinum through said openings in said layer of quartz; and
   attaching one or more leads to the remaining portions of said platinum.

2. The product of claim 1 wherein said first power level is greater than said second power level and said first time period is less than said second time period.

3. The product of claim 2 further comprising the step of: annealing said platinum.

4. The product of claim 3 further comprising the step of: depositing a second layer of quartz.

5. The product of claim 3 wherein said step of sputter etching said layer of silicon dioxide comprises:
   sputter etching said layer of silicon dioxide with a minimum sputtering power level of 2 watts per square inch.

6. The product of claim 5 wherein said first power level is in the range of 50 to 100 watts per square inch and said first time period is in the range of 2 to 20 seconds.

* * * * *